(12) United States Patent
Stickrod

(10) Patent No.: US 6,805,932 B2
(45) Date of Patent: Oct. 19, 2004

(54) METHOD FOR APPLYING DESIGNS TO A SUBSTRATE

(75) Inventor: Jon E. Stickrod, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 683 days.

(21) Appl. No.: 09/761,797

(22) Filed: Jan. 17, 2001

(65) Prior Publication Data

US 2003/0211267 A1 Nov. 13, 2003

(51) Int. Cl.$^7$ .................................................. B32B 3/10
(52) U.S. Cl. ...................... 428/40.1; 156/230; 156/236; 156/249; 156/289; 428/42.1; 428/46; 428/49; 428/192; 428/913.3
(58) Field of Search ............................... 428/40.1, 42.1, 428/46, 49, 192, 913.3; 156/230, 236, 249, 289

(56) References Cited

U.S. PATENT DOCUMENTS

| | | | |
|---|---|---|---|
| 4,192,905 A | 3/1980 | Scheibal | |
| 5,225,260 A | * 7/1993 | McNaul et al. | ............ 428/40.7 |
| 5,665,446 A | 9/1997 | Sundet | |
| 5,749,994 A | 5/1998 | Sundet | |
| 5,840,407 A | 11/1998 | Futhey et al. | |

* cited by examiner

*Primary Examiner*—Nasser Ahmad
(74) *Attorney, Agent, or Firm*—William L. Huebsch

(57) ABSTRACT

A method for decorating a substrate using a kit that includes a laminate comprising a cover sheet having a layer of adhesive on one surface, a predetermined printed design, and pieces of optical film that have peripheral shapes corresponding to parts of the printed design, each of which pieces has a layer of adhesive along one surface and grooves or other structure along an opposite surface so that the pieces visually simulate decorative structures. The pieces of optical film are placed over portions of the design corresponding to their shapes, the structured surfaces of the pieces of film are adhered to the adhesive on the laminate, and the pieces of optical film adhered to the layer of adhesive on the laminate are positioned at a desired location on the substrate. Air is pressed out from between the pieces of optical film and the substrate, after which the laminate is removed to leave the pieces of optical film adhered to the substrate in the predetermined design.

20 Claims, 6 Drawing Sheets

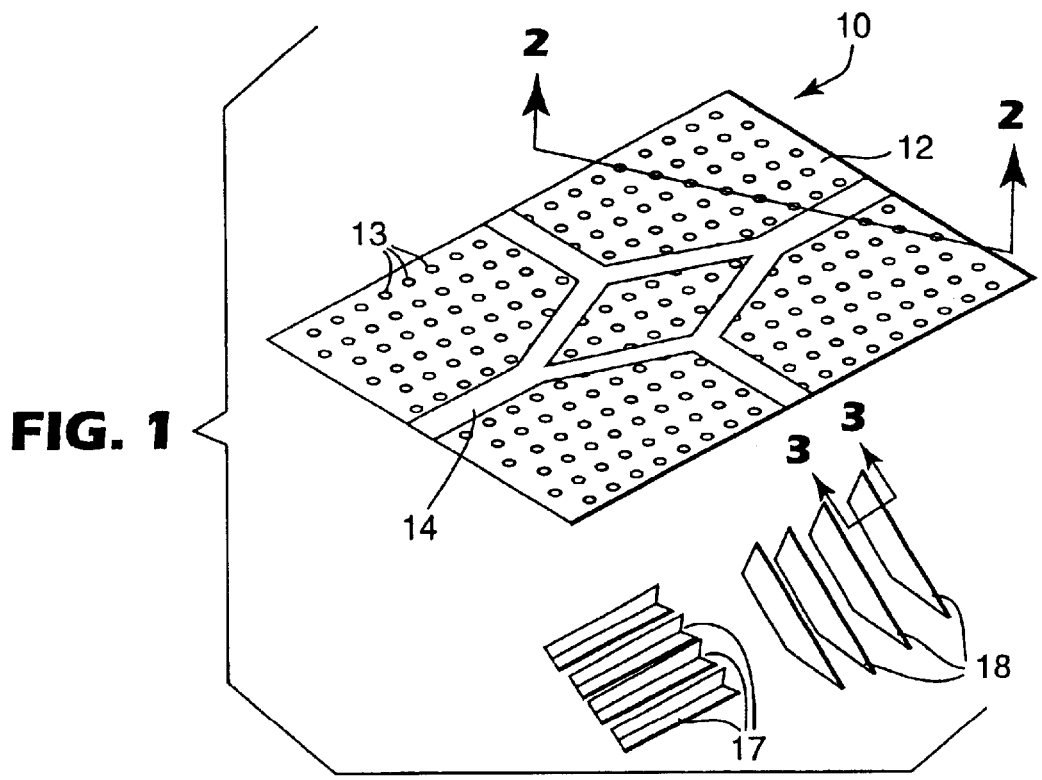
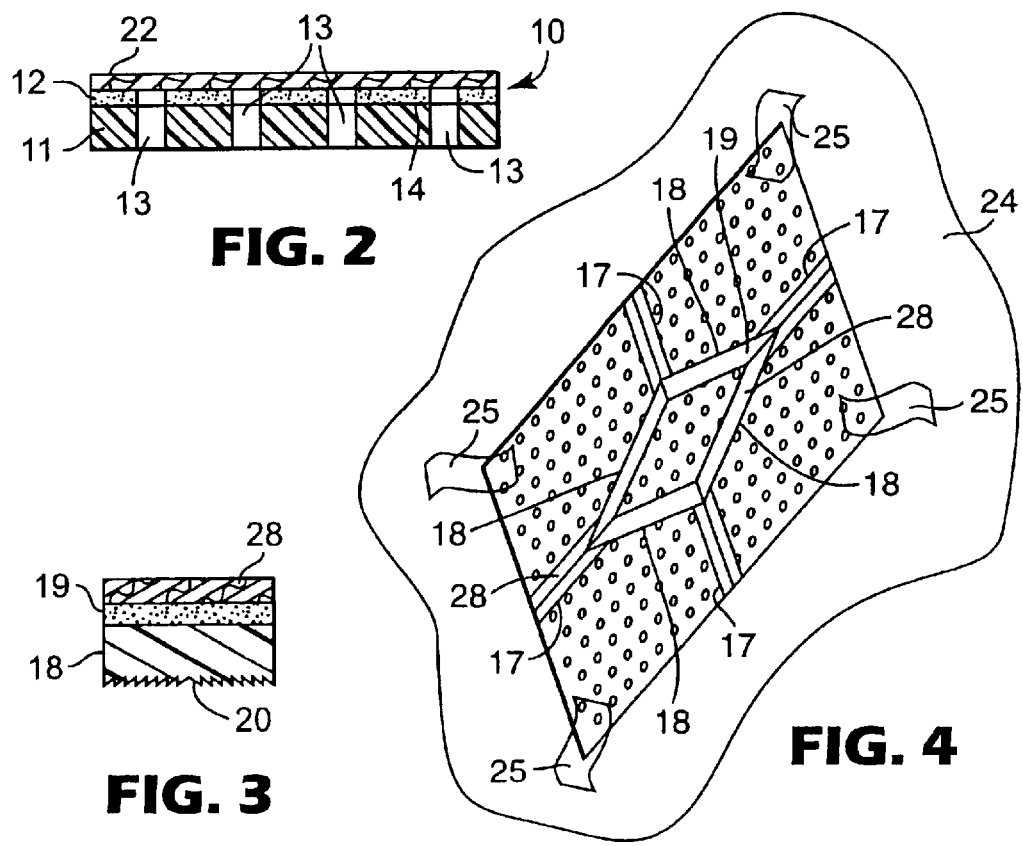

METHOD FOR APPLYING DESIGNS TO A SUBSTRATE

FIELD OF THE INVENTION

The present invention relates to methods and kits for applying adhesive coated decorative objects to substrates such as sheets of glass.

DESCRIPTION OF THE RELATED ART

U.S. Pat. No. 5,665,446 describes a method for applying pressure-sensitive adhesive coated graphics to a substrate (e.g., a sheet of glass) using a laminate comprising a polymeric cover sheet and a layer of pressure-sensitive adhesive adhered to one surface of the cover sheet with the cover sheet and layer of pressure-sensitive adhesive being vented. Generally that method includes the steps of adhering surfaces of the graphics opposite their layers of pressure-sensitive adhesive to the layer of pressure-sensitive adhesive on the laminate, using a solution to wet the graphics, the laminate and the substrate; placing the graphics adhered to the layer of pressure-sensitive adhesive on the laminate at a desired location on the substrate; pressing out air and water from between the substrate and the graphics adhered to the layer of pressure-sensitive adhesive on the laminate; allowing the solution to dry; and removing the laminate to leave the graphics adhered to the substrate.

U.S. Pat. No. 5,840,407 describes pieces of an optical film, each of which pieces have a layer of pressure-sensitive adhesive along one surface, and an opposite structured surface (e.g., a grooved and/or vapor coated surface) so that the pieces visually simulate decorative glass such as glass with beveled edges, or with a groove along its length, or with a leaded appearance, or with a textured surface, or visually simulate glass related structures such as metal came. Such pieces of optical film have been applied to substrates (e.g., window panes) in predetermined patterns using automated application equipment in industrial settings (e.g., by window manufacturers) for more than one year, however, heretofore it has been very difficult for persons such as homeowners to apply such optical film on windows or other glass substrates with the precision needed so that it provides the desired visual simulation.

SUMMARY OF THE INVENTION

The present invention provides a method for persons such as homeowners to accurately apply to a substrate (e.g., a sheet of glass in a window or mirror) decorative designs made using separate pieces of optical film of the type described in U.S. Pat. No. 5,840,407, each of which pieces has a layer of adhesive along one surface, and an opposite structured surface (e.g., a surface that is grooved and/or vapor coated) so that the pieces visually simulate decorative structures such as glass with beveled edges, or with a groove along its length, or with a leaded appearance, or with a textured surface, or glass related structures such as metal came.

Generally, the method according to the present invention comprises the steps of (1) providing a kit including a laminate that is at least translucent comprising a cover sheet with a layer of adhesive (e.g., pressure-sensitive adhesive) adhered to one surface; a predetermined printed design; and pieces of optical film that having peripheral shapes that correspond to parts of the printed design, each of which pieces of optical film have a layer of adhesive (e.g., pressure-sensitive adhesive) along one surface, and an opposite structured surface (e.g., a grooved and/or vapor coated surface) so that the pieces visually simulate decorative structures; (2) placing the pieces of optical film over portions of the design corresponding to their shapes with the structured surfaces of the pieces of film along a common plane; (3) adhering the layer of adhesive on the laminate to the structured surfaces of the pieces of film; (4) placing the pieces of optical film adhered to the layer of adhesive on the laminate at a desired location on the substrate, (5) pressing the laminate and thereby the pieces of optical film adhered to the laminate against the substrate, during which pressing step the laminate protects the structured surfaces of the pieces of film from damage; and (6) removing the laminate to leave the pieces of optical film adhered to the substrate in the predetermined design.

Preferably the laminate is or has been made transmissive of moisture vapor (e.g., a laminate that is vented as described in U.S. Pat. No. 5,665,446), a solution is used to wet the pieces of optical film, the laminate and the substrate prior to the step of placing the pieces of optical film adhered to the layer of adhesive on the laminate at a desired location on the substrate, which solution is allowed to dry between that step and the step of removing the laminate.

The printed design can be printed on the laminate or on a template that is positioned along the side of the laminate opposite its layer of adhesive. Step (2) (i.e., placing the pieces of optical film over portions of the design corresponding to their shapes) can then be accomplished by pressing the structured surfaces of the pieces of film against the layer of adhesive on the laminate while the laminate is supported on a planar surface. If the pieces of optical film have release liners over their layers of adhesive, those release liners should be removed before step (4) (i.e., placing the pieces of optical film adhered to the layer of adhesive on the laminate at a desired location on the substrate).

Alternatively, the predetermined printed design can be printed on a layer of at least translucent liner material (e.g., polyester) having a release surface shaped or treated to provide easy release from the layers of adhesive on the pieces of optical film, or the design can be printed on a template that is positioned along the side of the layer of liner material opposite its release surface. Step (2) (i.e., placing the pieces of optical film over portions of the design corresponding to their shapes) can then be accomplished by pressing the layers of adhesive on the pieces of optical film against the release surface on the liner material while the liner material is supported on a planar surface and after removing any release liners that were on those layers of adhesive. Step (3) (i.e., adhering the layer of adhesive on the laminate to the structured surfaces of the pieces of film) is then accomplished by pressing the layer of adhesive on the laminate against those structured surfaces on the pieces of film adhered to the liner material, after which the liner material is peeled away before step (4) (i.e., placing the pieces of optical film adhered to the layer of adhesive on the laminate at a desired location on the substrate).

BRIEF DESCRIPTION OF THE DRAWING

The present invention will be further described with reference to the accompanying drawing wherein like reference numerals refer to like parts in the several views, and wherein:

FIG. 1 schematically illustrates a kit provided as a first step in a first method according to the present invention for applying pieces of optical film to a substrate;

FIG. 2 is an enlarged sectional view taken approximately along line 2—2 in FIG. 1;

FIG. 3 is an enlarged sectional view taken approximately along line 3—3 in FIG. 1;

FIGS. 4 through 8 sequentially and schematically illustrate steps subsequent to the step illustrated in FIG. 1 in the first method according to the present invention for applying pieces of optical film to a substrate;

DETAILED DESCRIPTION OF THE INVENTION

Figure 5:
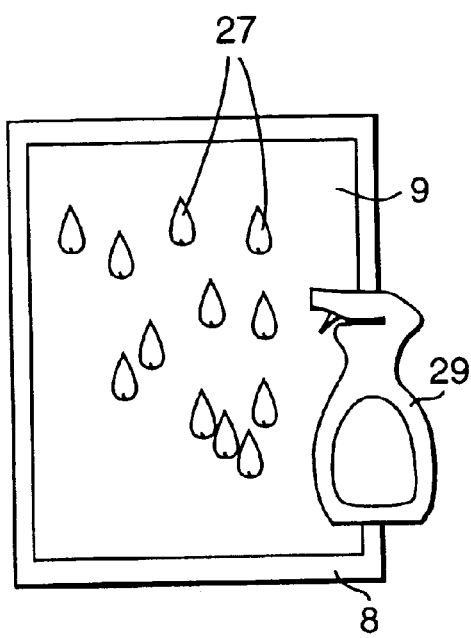
Figure 6:
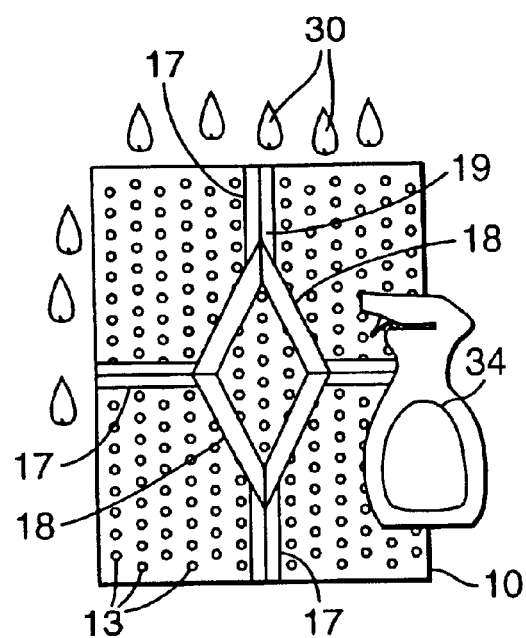
Figure 7:
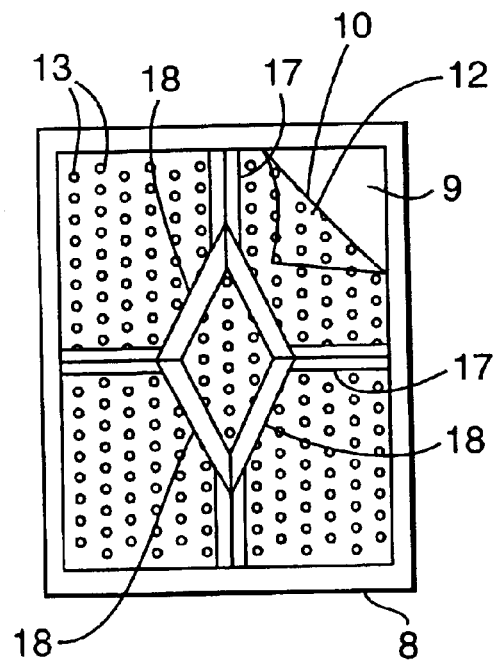
Figure 8:
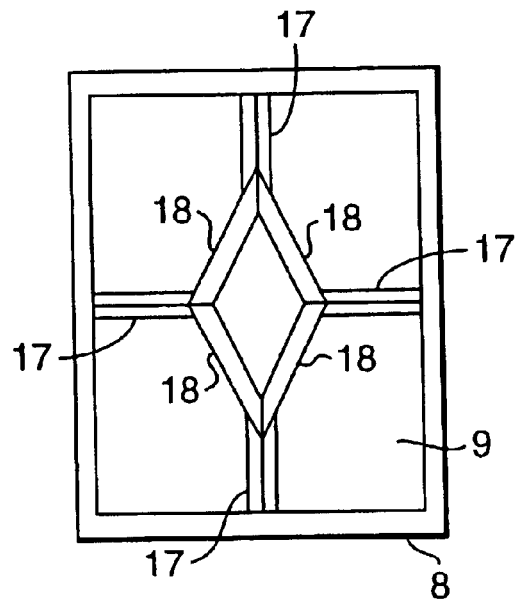

Referring now to FIGS. 1 through 8 there is sequentially and schematically illustrated a first method according to the present invention for decorating a substrate 9 (e.g., a pane of glass 9 surrounded by a frame 8). Generally, that method comprises providing a kit (see FIGS. 1, 2 and 3) including a laminate 10 that is at least translucent. By saying that the laminate 10 or any other structure described herein is "at least translucent" we mean that the laminate or other structure is translucent or transparent when dry or when wet, and specifically include laminates and other structures that are only translucent or transparent when wet. The laminate 10 comprises a polymeric cover sheet 11 and a layer 12 of pressure-sensitive adhesive adhered to one surface of the cover sheet 11. The laminate 10 allows transmission of moisture vapor between its major surfaces by means, including, but not limited to, being vented by passageways 13 through the cover sheet 11 and the layer 12 of adhesive between their major surfaces, (e.g., the laminate described in U.S. Pat. No. 5,749,994 issued May 12, 1998, the content whereof is hereby incorporated herein by reference). The kit also includes a predetermined printed design 14, which design 14 can be printed on the laminate 10 as is illustrated in FIGS. 1 and 2; and the kit includes pieces 17 and 18 of optical film that have peripheral shapes corresponding to parts of the printed design 14, each of which pieces 17 and 18 of optical film has a layer 19 of pressure-sensitive adhesive along one surface and grooves, vapor coating and/or other structure along an opposite structured surface 20 so that the pieces 17 and 18 visually simulate decorative glass, such as glass with beveled edges, or with a central groove along its length, or with a leaded appearance, or with a textured surface, or visually simulate a glass related structure such as brass or lead came (e.g., the pieces of optical film described in U.S. Pat. No. 5,840,407 issued Nov. 24, 1998, the content whereof is hereby incorporated herein by reference). A release liner 22 (illustrated only in FIG. 2) typically provided over the layer 12 of adhesive on the cover sheet 11 is removed, and the laminate 10 is supported with its layer 12 of adhesive uppermost on a horizontal surface 24 such as that of a tabletop (see FIG. 4) to which it can be temporarily attached as with pieces of adhesive coated tape 25. The method then further includes (see FIG. 4) placing the pieces 17 and 18 of optical film over portions of the design 14 corresponding to their shapes and adhering the structured surfaces 20 of the pieces 17 and 18 of film to the layer 12 of adhesive on the cover sheet 11 in that location. This places the structured surfaces 20 of the pieces 17 and 18 of film along a common plane. The substrate or glass sheet 9 to which the pieces 17 and 18 of film are to be attached should then be cleaned (e.g., with a liquid glass cleaner 27 from a squirt bottle 29) as illustrated in FIG. 5, and any release liners 28 present over the layers 19 of adhesive on the pieces 17 and 18 of optical film (illustrated only in FIG. 3) are removed. A solution 30 (e.g., 5% (by volume) rubbing alcohol in water or ½% (by volume) soap in water from a squirt bottle 34) is then used to wet the pieces 17 and 18 of optical film, the laminate 10 and the substrate 9 (see FIG. 6). The pieces 17 and 18 of optical film adhered to the layer 12 of adhesive on the cover sheet 11 are placed at a desired location on the substrate 9 (see FIG. 7); air and water are pressed out from between the substrate 9 and the pieces 17 and 18 of optical film adhered to the layer 12 of adhesive on the cover sheet 11, during which pressing the laminate 10 protects the structured surfaces 20 of the pieces 17 and 18 of film from damage; and the solution 30 is allowed to dry. The laminate 10 is then peeled away to leave the pieces 17 and 18 of optical film adhered to the substrate 9 in the predetermined design (see FIG. 8).

The kit including the laminate 10 on which the design 14 is printed together with the pieces 17 and 18 of optical film that have peripheral shapes corresponding to parts of the printed design 14 can be provided to a person such a homeowner who can decorate a surface such as the surface of a window or mirror using the method described above.

Figure 9:
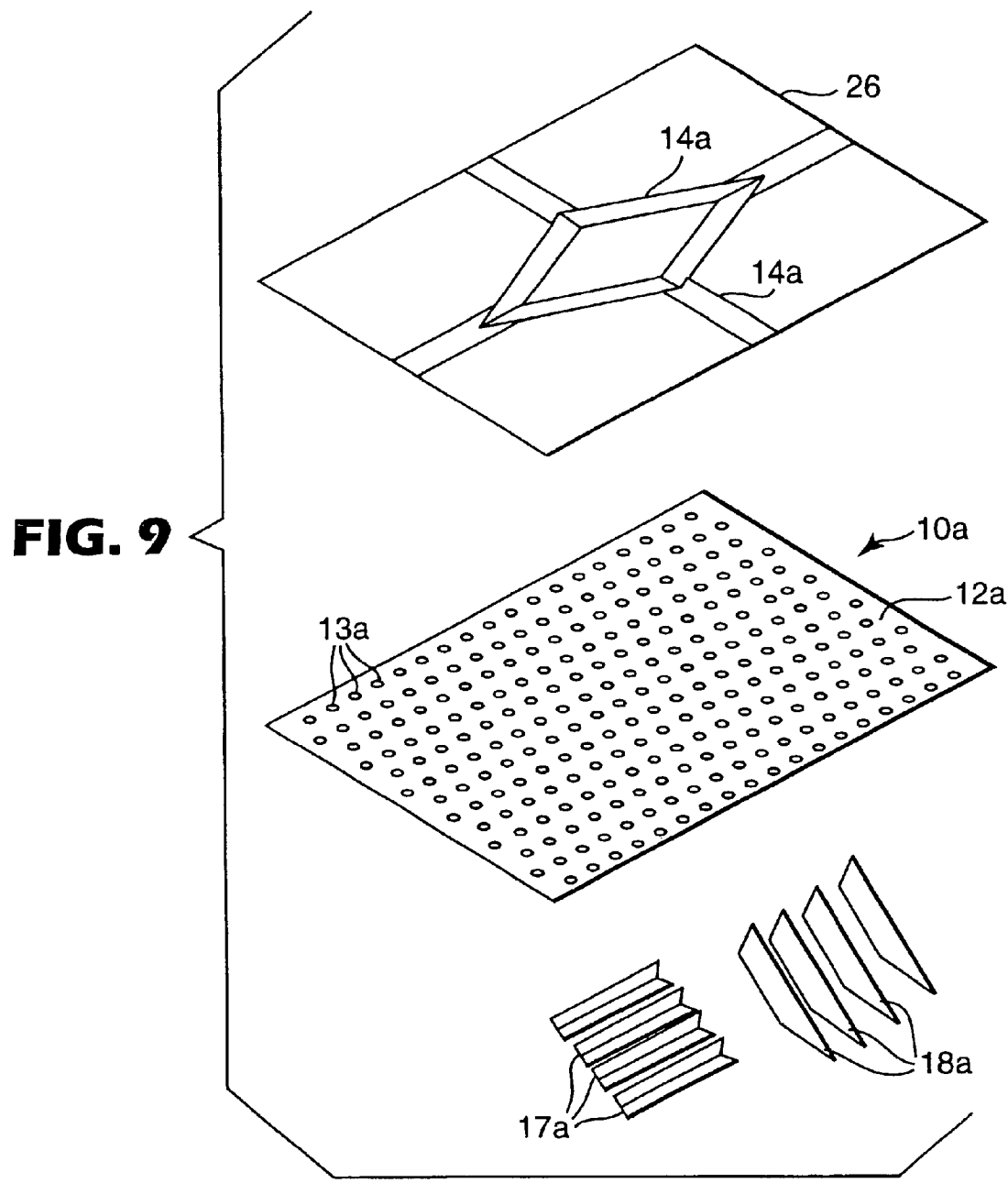
FIG. 9 illustrates a modification of the kit illustrated in FIG. 1 that can be used in a method according to the present invention for applying pieces of optical film to a substrate that is similar to but slightly modified from the first method.

FIG. 9 illustrates a modification of the kit illustrated in FIG. 1 that is used in a method slightly modified from the method described above with reference to FIGS. 1 through 8. As is illustrated in FIG. 9 (wherein structural parts that are essentially the same as those illustrated in FIG. 1 are identified by the same reference numerals to which have been added the suffix "a"), the predetermined printed design 14a can be printed on a template 26 made of paper or thin polymeric material rather than being printed on the laminate 10 as illustrated in FIGS. 1 and 2. The first method described above is then modified in that the template 26 is positioned behind the at least translucent laminate 10a on its side opposite the layer 12a of adhesive after which the pieces 17a and 18a of optical film are positioned over portions of the design 14a corresponding to their shapes and their structured surfaces 20a are adhered to the layer 12a of pressure-adhesive on the cover sheet 11a. The rest of the method for decorating a substrate remains the same as that described above with reference to FIGS. 5 through 8. A kit for use by a person in decorating a surface (e.g., for use by a homeowner in decorating a window or mirror) can thus include the laminate 10a, one or more of the templates 26 on which the design 14a or a variety of designs are printed, together with the pieces 17a and 18a of optical film that have peripheral shapes corresponding to parts of the printed design 14a or designs. Such a kit could provide a selection of designs, any of which could utilize the same laminate 10a to apply it.

Figure 10:
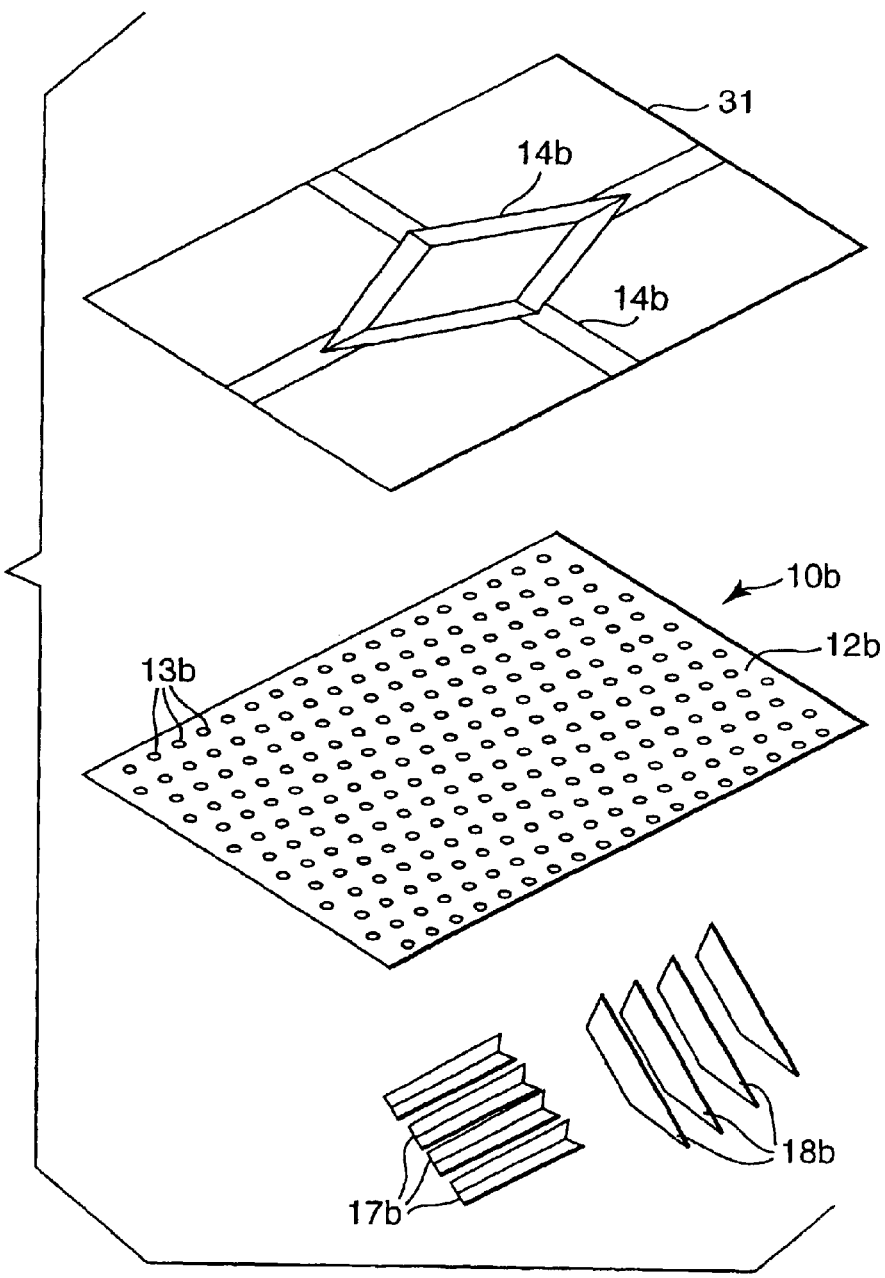
FIG. 10 schematically illustrates a kit provided as a first step in a second method according to the present invention for applying pieces of optical film to a substrate.
Figure 11:
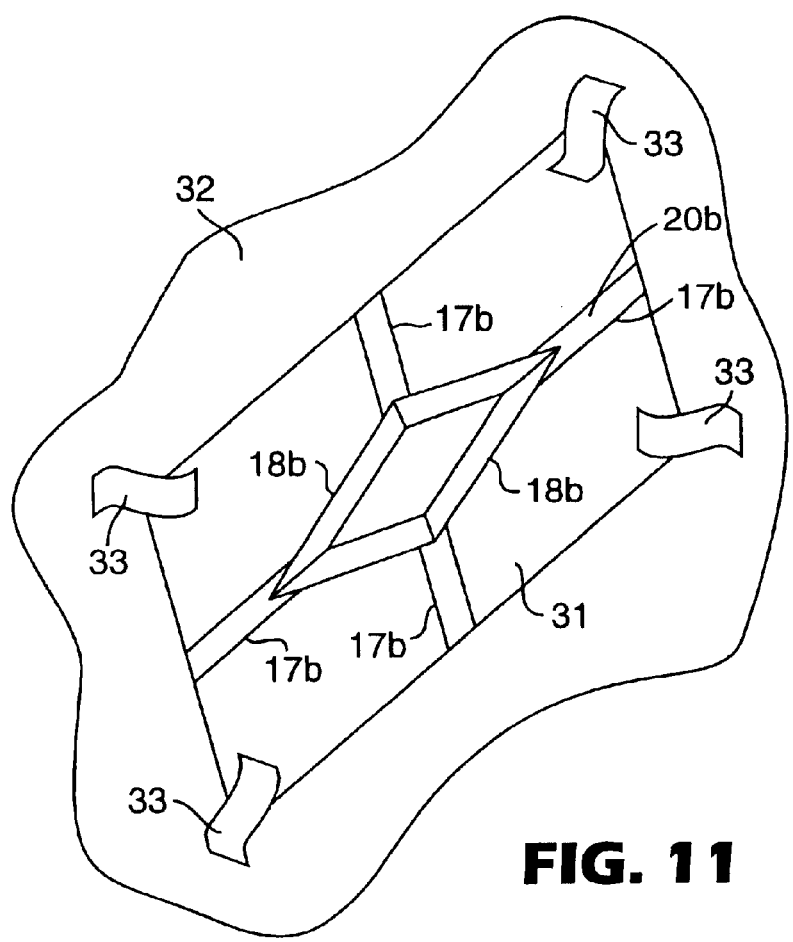
FIG. 11 schematically illustrates a step subsequent to the step illustrated in FIG. 10 in the second method according to the present invention for applying pieces of optical film to a substrate.
Figure 12:
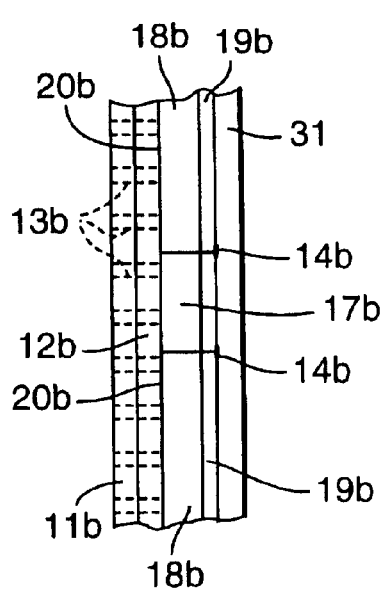
FIG. 12 is an enlarged fragmentary view schematically illustrating a step subsequent to the step illustrated in FIG. 11 in the second method according to the present invention for applying pieces of optical film to a substrate.

Referring now to FIGS. 10, 11, and 12, there is sequentially and schematically illustrated parts of a second method according to the present invention for decorating a substrate. The second method uses essentially the same structures used in the first method described above with reference to FIGS. 1 through 8, (which structures have been given the same reference numerals to which have been added the suffix "b") together with a layer 31 of polymeric liner material that is at least translucent. Generally, like the first method, the second method comprises providing a kit (see FIG. 10) including a laminate 10b that is at least translucent and comprises a polymeric cover sheet 11b and a layer 12b of pressure-sensitive adhesive adhered to one surface of the cover sheet 11b, which laminate 10b allows transmission of moisture vapor between its major surfaces by means such as being vented by passageways 13b between their major surfaces, (e.g., the laminate described in U.S. Pat. No. 5,749,994); including a predetermined printed design 14b, and including pieces 17b and 18b of optical film that have peripheral shapes corresponding to parts of the printed design 14b, each of which pieces 17b and 18b of optical film has a layer 19b of pressure-sensitive adhesive along one surface and grooves, vapor coating, or other structure along an opposite structured surface 20b so that the pieces 17b and 18b visually simulate decorative glass or glass related structures (e.g., the pieces of optical film described in U.S. Pat. No. 5,840,407). The second method differs from the first method described above in that, instead of the predetermined printed design 14b being printed on the laminate lob, it is instead printed on the layer 31 of polymeric liner material (e.g., 0.001 to 0.004 inch or 0.0025 to 0.010 centimeter thick polyester). The layer 31 of liner material has a release surface shaped or treated to provide easy release from the layers 19b of adhesive on the pieces 17b and 18b of optical film. The layer 31 of liner material is supported with its release surface uppermost on a horizontal surface 32 such as that of a tabletop (see FIG. 11) to which it can be temporarily attached as with pieces of adhesive coated tape 33. The pieces of optical film 17b and 18b are placed over portions of the design 14b corresponding to their shapes on the layer 31 of liner material (see FIG. 11) and the layers 19b of adhesive on the pieces 17b and 18b of optical film are pressed against the release surface on the layer 31 of liner material after removing any release liners that were on those layers 19b of adhesive. This places the structured surfaces 20b of the pieces 17b and 18b of film along a common plane. The release liner typically provided over the layer 12b of adhesive coating on the cover sheet 11b is removed and the layer 12b of adhesive on the cover sheet 11b is then pressed against and adhered to the structured surfaces 20b on the pieces 17b and 18b of film adhered to the liner material 31 (see FIG. 12), after which the liner material 31 is peeled away. The cover sheet 11b with the pieces 17b and 18b of film adhered to it by the layer of adhesive 12b is then used to apply the pieces 17b and 18b to the substrate in the manner described above with reference to FIGS. 5 through 8 of the drawing.

Figure 14:
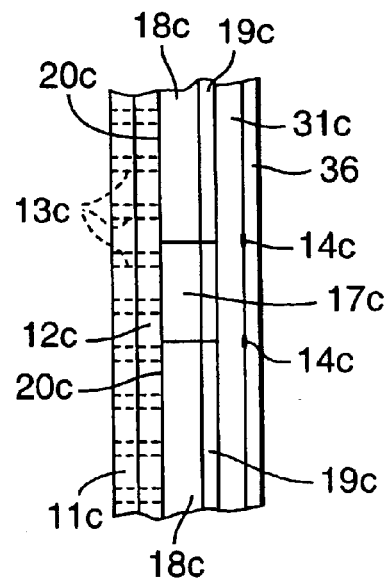
FIG. 14 is an enlarged fragmentary view schematically illustrating a step subsequent to the step illustrated in FIG. 13 in the modified second method according to the present invention for applying pieces of optical film to a substrate.
Figure 13:
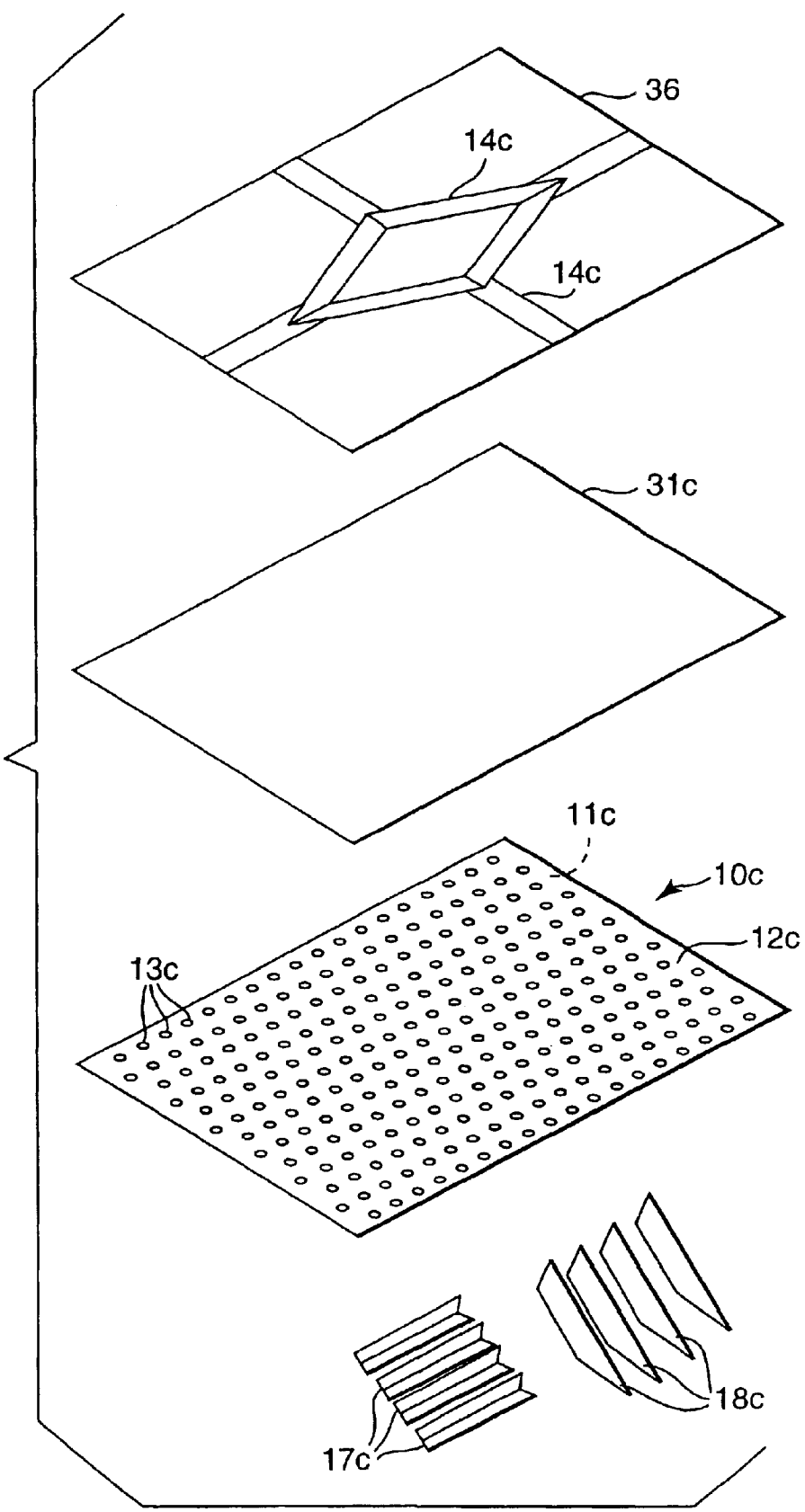
FIG. 13 illustrates a modification of the kit illustrated in FIG. 11 that can be used in a method according to the present invention for applying pieces of optical film to a substrate that is similar to but slightly modified from the second method.

FIG. 13 illustrates a modification of the kit illustrated in FIG. 10 that is used in a method slightly modified from the second method described above with reference to FIGS. 10 and 11. As is illustrated in FIG. 13 (wherein structural parts that are essentially the same as those illustrated in FIG. 10 are identified by the same reference numerals to which have been added the suffix "c"), the predetermined printed design 14c, instead of being printed on the layer 31 of liner material as illustrated in FIG. 10, can be printed on a template 36 of paper or thin polymeric material that is positioned behind the layer 31c of liner material on its side opposite its release surface as the pieces 17c and 18c of optical film are placed over portions of the design 14c corresponding to their shapes and the layers 19c of adhesive on the pieces 17c and 18c of optical film are pressed against the release surface on the layer 31c of liner material after supporting the layer 31c of liner material on a planar surface and removing any release liners that were on those layers 19c of adhesive. This places the structured surfaces 20c of the pieces 17c and 18c of film along a common plane. The release liner typically provided over the layer 12c of adhesive coating on the cover sheet 11c is removed and the layer 12c of adhesive on the cover sheet 11c is then pressed against and adhered to the structured surfaces 20c on the pieces 17c and 18c of film adhered to the liner material 31 (see FIG. 14), after which the liner material 31c is peeled away. The cover sheet 11c with the pieces 17c and 18c of film adhered to it by the layer of adhesive 12c is then used to apply the pieces 17c and 18c to the substrate in the manner described above with reference to FIGS. 5 through 8 of the drawing. A kit for use by a person in decorating a surface (e.g., for use by a homeowner in decorating a window or mirror) can thus include the laminate 10c, one or more of the templates 36 on which the design 14c or a variety of designs are printed, together with the pieces 17c and 18c of optical film that have peripheral shapes corresponding to parts of the printed design 14c or designs. Such a kit could provide a selection of designs, any of which could utilize the same laminate 10c to apply the pieces 17c and 18c in a pattern corresponding to the designs as described above. Alternatively, the template 36 need not be used, and a person could arrange the pieces 17c and 18c on the laminate 31c in a desired decorative pattern designed or selected by the user without the use of the design 14c. The layers 19c of adhesive on the pieces 17c and 18c of optical film would be pressed against the release surface on the layer 31c of liner material after the desired arrangement of the pieces 17c and 18c was determined and any release liners that were on the layers 19c of adhesive on those pieces 17c and 18c were removed. The rest of this further modified second method for decorating a substrate would then remain the same as that described above with reference to FIGS. 10, 11 and 12 or to FIGS. 13 and 14.

The present invention has now been described with reference to several embodiments and modifications thereof. It will be apparent to those skilled in the art that many changes can be made in the embodiments described without departing from the scope of the present invention. For example, it may be useful for some applications to provide one or both of the pieces 17, 17a, 17b, 17c, or 18, 18a, 18b, 18c in a shape that requires the person applying the kit to use a cutting device such as a razor blade to sever the pieces to a desired shape or length depending on the particular pattern that is used, or the size of the substrate to which the kit is applied. Thus, some of the pieces could have lengths that required them to be shortened before or after the kit is applied, or could have ends that are cut to one shape if one pattern was to be used or to another shape if another pattern was used. The adhesive on the pieces and/or on the cover sheet 11, 11a, 11b, 11c could be other than a pressure sensitive adhesive such as an adhesive that is activated by the application of a liquid, or the application of heat. The cover sheet and adhesive in the laminate 10, 10a, 10b, 10c could be of materials that allow moisture vapor transmission without vent holes of the type illustrated. Thus, the scope of the present invention should not be limited to the methods and structures described in this application, but only by the methods and structures described by the language of the claims and the equivalents thereof.

What is claimed is:

1. A method for decorating a substrate comprising the steps of;
   providing a kit including a laminate that is at least translucent comprising a cover sheet and a layer of adhesive adhered to one surface of the cover sheet; including a predetermined printed design, and including loose pieces of optical film that have peripheral shapes corresponding to at least parts of the printed design, each of which pieces of optical film have a layer of adhesive along one surface, and grooves or other structure along an opposite surface so that the pieces visually simulate decorative structures;
   placing the pieces of optical film over portions of the design corresponding to their shapes with the structured surfaces of the pieces of film along a common plane;
   adhering the structured surfaces of the pieces of film to the layer of adhesive on the laminate;
   placing the pieces of optical film adhered to the layer of adhesive on the laminate at a desired location on the substrate;
   pressing out air from between the substrate and the pieces of optical film adhered to the layer of adhesive on the laminate; and
   removing the laminate to leave the pieces of optical film adhered to the substrate in at least the predetermined design.

2. A method according to claim 1 wherein the cover sheet and layer of adhesive on the cover sheet allow moisture vapor to pass between the surfaces of the laminate; the method further includes the step of using a solution to wet the pieces of optical film, the laminate and the substrate before said step of placing the pieces of optical film adhered to the layer of adhesive on the laminate at a desired location on the substrate, and the step of allowing the solution to dry before said removing step; and said pressing step includes also pressing out water from between the substrate and the pieces of optical film adhered to the layer of adhesive on the laminate.

3. A method according to claim 1 wherein the predetermined printed design is printed on the laminate, and said step of placing the pieces of optical film over portions of the design corresponding to their shapes comprises the step of pressing the structured surfaces of the pieces of film against the layer of adhesive on the laminate.

4. A method according to claim 3 wherein the layers of adhesive on the laminate and on the pieces of optical film are layers of pressure-sensitive adhesive, release liners are provided over the layers of adhesive on the pieces of optical film, and the method further comprises the step of removing the release liners before said step of placing the pieces of optical film adhered to the layer of adhesive on the laminate at a desired location on the substrate.

5. A method according to claim 1 wherein the predetermined printed design is printed on a template provided in the kit, and said method includes the step of positioning the template along the side of the laminate opposite the layer of adhesive during said steps of placing the pieces of optical film over portions of the design corresponding to their shapes and adhering the structured surfaces of the pieces of film to the layer of adhesive on the laminate.

6. A method according to claim 1 wherein the predetermined printed design is printed on a layer of liner material that is at least translucent and has a release surface shaped or treated to provide easy release from the layers of adhesive on the pieces of optical film, said step of placing the pieces of optical film over portions of the design corresponding to their shapes comprises the step of pressing the layers of adhesive on the pieces of optical film against the release surface on the liner material, said step of adhering the structured surfaces of the pieces of film to the layer of adhesive on the laminate comprises the step of pressing the layer of adhesive on the laminate against the structured surfaces on the pieces of film adhered to the liner material, and said method further includes the subsequent step of pealing away the liner material before said step of placing the pieces of optical film adhered to the layer of adhesive on the laminate at a desired location on the substrate.

7. A method according to claim 1 wherein the predetermined printed design is printed on a template provided in the kit, a layer of at least translucent liner material having a release surface shaped or treated to provide easy release from the layers of adhesive on the pieces of optical film is provided in the kit, said method includes the step of positioning the template along the side of the layer of liner material opposite its release surface, and said step of placing the pieces of optical film over portions of the design corresponding to their shapes comprises the step of pressing the layers of adhesive on the pieces of optical film against the release surface on the liner material, said step of adhering the structured surfaces of the pieces of film to the layer of adhesive on the laminate comprises the step of pressing the layer of adhesive on the laminate against the structured surfaces on the pieces of film adhered to the liner material, and said method further includes the subsequent step of pealing away the liner material before said step of placing the pieces of optical film adhered to the layer of adhesive on the laminate at a desired location on the substrate.

8. A method according to claim 1 wherein at least one of the pieces of optical film has a peripheral shape that corresponds to only a part of the printed design, and said method further includes the step of cutting said at least one of the pieces of optical film.

9. A method for decorating a substrate comprising the steps of;
   providing a kit including a laminate that is at least translucent comprising a cover sheet and a layer of pressure-sensitive adhesive adhered to one surface of the cover sheet with the cover sheet and layer of adhesive being vented; including loose pieces of optical film, cinch of which pieces of optical film has a layer of pressure-sensitive adhesive along one surface and has grooves or other structure along an opposite surface so that the pieces visually simulate decorative glass or glass related structures; and including a layer of liner material having a release surface shaped or treated to provide easy release from the layers of adhesive on the pieces of optical film;
   pressing the layers of adhesive on the pieces of optical film against the release surface on the liner material to provide a decorative pattern;
   pressing the layer of pressure-sensitive adhesive on the laminate against the structured surfaces on the pieces of film adhered to the liner material;
   pealing away the liner material;
   using a solution to wet the pieces of optical film, the laminate and the substrate;
   placing the pieces of optical film adhered to the layer of adhesive on the laminate at a desired location on the substrate;
   pressing out air and water from between the substrate and the pieces of optical film adhered to the layer of adhesive on the laminate;

allowing the solution to dry; and removing the laminate to leave the pieces of optical film adhered to the substrate in the decorative pattern.

10. A method according to claim 9 wherein a predetermined design is printed on the layer of liner material, and said step of pressing the layers of adhesive on the pieces of optical film against the release surface on the liner material to provide a decorative pattern comprises placing the pieces of optical film over portions of the design corresponding to the shapes of the pieces of optical film.

11. A method according to claim 9 wherein a predetermined design is printed on a template provided in the kit, and said step of pressing the layers of adhesive on the pieces of optical film against the release surface on the liner material to provide a decorative pattern includes the steps of positioning the template along the side of the layer of liner material opposite its release surface, and placing the pieces of optical film over portions of the design corresponding to the shapes of the pieces of optical film.

12. A kit for decorating a substrate, said kit comprising:

a laminate that is at least translucent comprising a cover sheet and a layer of adhesive adhered to one surface of the cover sheet;

a predetermined printed design;

loose pieces of optical film that have peripheral shapes corresponding to at least parts of the printed design, each of which pieces of optical film has a layer of adhesive along one surface and has grooves along an apposite surface so that the pieces visually simulate decorative structures;

said kit affording placing the pieces of optical film over portions of the design corresponding to their shapes with the structured surfaces of the pieces of film generally along a common plane; adhering the structured surfaces of the pieces of flim to the layer of adhesive on the laminate; placing the pieces of optical film adhered to the layer of adhesive on the laminate at a desired location on the substrate; pressing out air from between the pieces of optical film adhered to the layer of adhesive on the laminate end the substrate; and removing the laminate to leave the pieces of optical film adhered to the substrate in the predetermined design.

13. A kit according to claim 12 wherein the predetermined printed design is printed on the laminate so that the pieces of optical film can be placed over portions of the design corresponding to their shapes by pressing the structured surfaces of the pieces of film against the layer of adhesive on the laminate.

14. A kit according to claim 12 wherein the layers of adhesive on the laminate and on the pieces of optical film are layers of pressure-sensitive adhesive, and the kit further includes release liners over the layers of adhesive on the pieces of optical film, which release liners must be removed before placing the pieces of optical film adhered to the layer of adhesive on the laminate at a desired location on the substrate.

15. A kit according to claim 12 further including a template on which the predetermined printed design is printed, which template is positioned along the side of the laminate opposite the layer of adhesive when placing the pieces or optical film over portions of the design corresponding to their shapes and pressing the structured surfaces of the pieces of film against the layer of adhesive on the laminate.

16. A kit according to claim 12 wherein the predetermined printed design is printed on a layer of liner material having a release surface shaped or treated to provide easy release from the layers of adhesive on the pieces of optical film so that placing the pieces of optical film over portions of the design corresponding to their shapes involves pressing the layers of adhesive on the pieces of optical film against the release surface on the liner material, and adhering the structured surfaces of the pieces of film to the layer of adhesive on the laminate involves pressing the layer of adhesive on the laminate against the structured surfaces on the pieces of film adhered to the liner material, after which the liner material is peeled away before placing the pieces of optical film adhered to the layer of removable adhesive on the laminate at a desired location on the substrate.

17. A kit according to claim 12 further including a layer of liner material that is at least translucent having a release surface shaped or treated to provide easy release from the layers of adhesive on the pieces of optical film, and a template with the predetermined printed design being printed on the template, the template being positioned along the side of the layer of liner material opposite said release surface, the pieces of optical film being positioned over portions of the design corresponding to their shapes by pressing the layers of adhesive on the pieces of optical film against the release surface on ihe liner material, the structured surfaces of the pieces of film then being adhered to the layer of adhesive on the laminate by pressing the layer of adhesive on the laminate against the structured surfaces on the pieces of film adhered to the liner material, after which the liner material is peeled away before placing the pieces of optical film adhered to the layer of adhesive on the laminate at a desired location on the substrate.

18. A kit for decorating a substrate, said kit comprising:

a laminate that is at least translucent comprising a cover sheet and a layer of pressure-sensitive adhesive adhered to one surface of the cover sheet with the cover sheet and layer of adhesive being vented; loose pieces of optical film, each of which pieces of optical film has a layer of pressure-sensitive adhesive along one surface and has grooves or other structure along an opposite surface so that the pieces visually simulate decorative glass or glass related structures; and a layer of liner material having a release surface shaped or treated to provide easy release from the layers of adhesive on the pieces of optical film; said kit affording pressing the layers of adhesive on the pieces of optical film against the release surface on the liner material to provide a decorative pattern; pressing the layer of adhesive on the laminate against the structured surfaces on the pieces of film adhered to the liner material; pealing away the liner material; placing the pieces of optical film adhered to the layer of adhesive on the laminate at a desired location on the substrate; pressing out air from between the substrate and the pieces of optical film adhered to the layer of adhesive on the laminate; and removing the laminate to leave the pieces of optical film adhered to the substrate in the decorative pattern.

19. A kit according to claim 18 wherein a predetermined design is printed on the layer of liner material to afford placing the pieces of optical film over portions of the design corresponding to the shapes of the pieces of optical film.

20. A kit according to claim 18 further including a template and a predetermined design printed on the template to afford positioning the template along the side of the layer of liner material opposite its release surface, and placing the pieces of optical film over portions of the design corresponding to the shapes of the pieces of optical film.

* * * * *

UNITED STATES PATENT AND TRADEMARK OFFICE
CERTIFICATE OF CORRECTION

PATENT NO. : 6,805,932 B2
DATED : October 19, 2004
INVENTOR(S) : Stickrod, Jon E.

It is certified that error appears in the above-identified patent and that said Letters Patent is hereby corrected as shown below:

Column 5,
Line 33, delete "lob" and insert -- 10b --

Column 7,
Line 7, after "design" delete "," and insert -- ; --

Column 8,
Line 45, delete "cinch" and insert -- each --

Column 9,
Line 30, delete "apposite" and insert -- opposite --
Line 36, delete "flim" and insert -- film --
Line 41, delete "end" and insert -- and --
Line 63, delete "or" and insert -- of --

Column 10,
Line 23, delete "ihe" and insert -- the --

Signed and Sealed this

Nineteenth Day of April, 2005

JON W. DUDAS
*Director of the United States Patent and Trademark Office*